I. PUTNAM.
CHICKEN STOVE LAMP.
APPLICATION FILED AUG. 31, 1916.
1,249,668.
Patented Dec. 11, 1917.
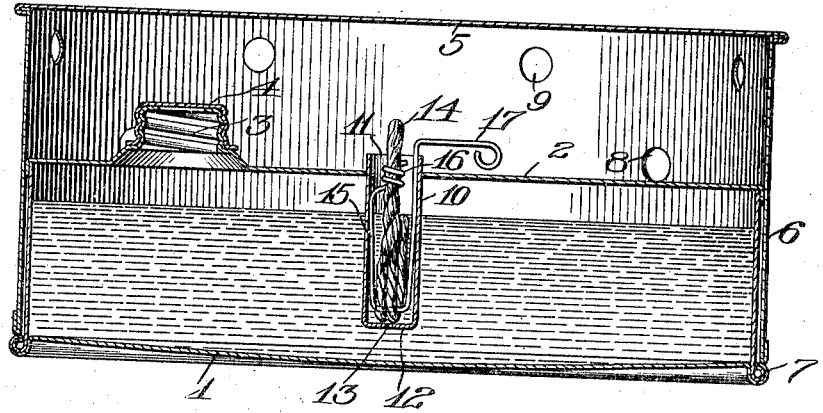
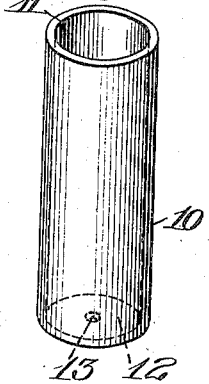
WITNESSES:
Walter B. Payne
Russell B. Griffith
INVENTOR
Israel Putnam
BY
his ATTORNEYS

UNITED STATES PATENT OFFICE.

ISRAEL PUTNAM, OF ELMIRA, NEW YORK.

CHICKEN-STOVE LAMP.

1,249,668. Specification of Letters Patent. Patented Dec. 11, 1917.

Application filed August 31, 1916. Serial No. 117,835.

*To all whom it may concern:*

Be it known that I, ISRAEL PUTNAM, a citizen of the United States, and a resident of Elmira, in the county of Chemung and State of New York, have invented certain new and useful Improvements in Chicken-Stove Lamps; and I do hereby declare the following to be a full, clear, and exact description of the same, reference being had to accompanying drawings, forming a part of this specification, and to the reference-numerals marked thereon.

My present invention relates to oil burning lamps and more particularly to lamps adapted for use in small stoves such as those used in chicken houses for removing the chill and for preventing the water provided for the fowls to drink from freezing and the invention has for its object to provide a simple, cheap and efficient lamp of this character that will burn for a long period without attention; will reduce the possibility of a fire occurring through the ignition of the oil supply and which will not be affected by certain influences attendant upon the use of such a lamp in extremely cold weather. To these and other ends the invention resides in certain improvements and combinations of parts all as will be hereinafter more fully described, the novel features being pointed out in the claims at the end of the specification.

In the drawings:

Figure 1 is a central vertical section through a chicken stove provided with a lamp constructed in accordance with and illustrating one embodiment of my invention, and Fig. 2 is an enlarged perspective view of the wick tube.

Similar reference numerals throughout the several views indicate the same parts.

In the present instance, the stove comprises a lower section 1 consisting of a sealed oil reservoir having a top 2 provided with a neck 3 and cap 4, as usual, for filling it. Fitting over this lower portion or reservoir is an upper portion or top 5 of greater depth, the side walls 6 of which may rest upon a bead 7 provided at the bottom edge of the reservoir. There is thus provided a heating space between the top 2 of the lower section and the stove top 5 upon which latter a water vessel may be placed that it is desired to keep from freezing and the walls 6 of the upper portion are provided at intervals with draft and vent apertures 8 and 9, respectively.

Extending through the top 2 of the reservoir and downwardly into the oil contained therein is a wick tube 10 that is entirely open at its upper end 11 but closed at its lower end 12 except for a very restricted aperture 13 that is just about sufficient in size to permit the oil to feed into the tube a little more rapidly than it is burned. The end 12 is spaced from the bottom of the reservoir but is sufficiently near it to take advantage as far as possible of the full body of oil.

The burner tube 10 will, of course, maintain a level of oil equal to that in the reservoir and contained wholly within the tube is a wick 14 that may be of the ordinary twisted variety but which is much smaller than the tube so that it is spaced from the walls thereof, particularly at the top 11 of the latter. The wick is suitably held in its central position within the tube as by a bent wire holder 15, one end of which is formed into an eye 16 embracing the wick and the other end of which is formed into an upwardly and laterally projecting finger-piece 17 for raising and lowering the holder and wick in the tube as required. The holder is compressed into the tube so that its spring tension will hold it in any position to which it is adjusted.

The purpose of spacing the wick 14 from the walls of the tube 10 is to permit the gases from the oil within the tube to escape freely and burn at the mouth thereof and more particularly, to prevent carbon accumulations that would otherwise incrust the wick and tube at the point of combustion and require frequent trimming of the wick. Carbon particles that may form on the burning end of the wick do not come in contact with the mouth of the tube but fall within the latter instead and may be easily removed from time to time by withdrawing the wick although their presence does not greatly interfere with the continued operation of the lamp.

My present invention has particular reference to the provision of the restricted passage 13 at the lower end of the tube 10 between the interior of the latter and the body of oil within the reservoir. Were the tube not closed at 12, there would be a fire danger as soon as the oil reached a level at the lower end of the tube while if such an open tube were carried down very close to the bottom of the container to thus restrict communication between the tube and reservoir, the lamp would be apt to freeze in very extreme weather. This freezing is due to the fact that because of the peculiar relationship between the wick and its tube, the flame generates moisture that accumulates within the tube and eventually forms a film on the bottom of the reservoir. This film of water when frozen, would seal the lower end of the tube and hence it is advantageous to have this tube at an elevation above any possible point of contact with this accumulation in water. By the provision of the restricted aperture 13, this elevation of the tube can be safely maintained without fire danger. The moisture can nevertheless pass out of the tube through the aperture and form at a distance therefrom on the bottom of the reservoir where its freezing does not interfere with the normal flow of oil and the proper operation of the lamp.

I claim as my invention:

In an oil lamp, the combination with a sealed reservoir, of a wick tube extending downwardly therein from the top wall of the reservoir and having a closed bottom except for a fine or restricted opening therein, the bottom of the tube being spaced from the bottom of the reservoir, a wick in the tube, and means for supporting the wick in spaced relationship to the walls of the tube so that an air space is left around the wick from the mouth of the tube down to the level of the oil therein.

ISRAEL PUTNAM.

Witnesses:
ISRAEL PUTNAM, Jr.,
CHARLES S. PUTNAM.

Copies of this patent may be obtained for five cents each, by addressing the "Commissioner of Patents, Washington, D. C."